United States Patent
Silveira et al.

(10) Patent No.: US 10,868,999 B2
(45) Date of Patent: Dec. 15, 2020

(54) EYE GAZE ANGLE FEEDBACK IN A REMOTE MEETING

(71) Applicant: HEWLETT-PACKARD DEVELOPMENT COMPANY, L.P., Houston, TX (US)

(72) Inventors: Roberto Pereira Silveira, Porto Alegre (BR); Thomas Paula, Porto Alegre (BR); Wagner Rampon, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 134 days.

(21) Appl. No.: 16/075,693

(22) PCT Filed: Jan. 19, 2017

(86) PCT No.: PCT/US2017/014085
§ 371 (c)(1),
(2) Date: Aug. 6, 2018

(87) PCT Pub. No.: WO2018/136063
PCT Pub. Date: Jul. 26, 2018

(65) Prior Publication Data
US 2020/0169693 A1    May 28, 2020

(51) Int. Cl.
*H04N 7/14* (2006.01)
*G06T 7/73* (2017.01)

(52) U.S. Cl.
CPC ............... *H04N 7/141* (2013.01); *G06T 7/73* (2017.01); *G06T 2207/20081* (2013.01); *G06T 2207/20084* (2013.01); *G06T 2207/30201* (2013.01)

(58) Field of Classification Search
CPC .............. H04N 7/14; H04N 7/15; G06T 7/73
(Continued)

(56) References Cited

U.S. PATENT DOCUMENTS

| 8,392,503 | B2 | 3/2013 | Kuhlke et al. |
| 8,401,248 | B1 | 3/2013 | Moon |

(Continued)

FOREIGN PATENT DOCUMENTS

| WO | 2015189829 A1 | 12/2015 | |
| WO | WO-2015189829 A1 * | 12/2015 | ............. A61B 3/113 |

OTHER PUBLICATIONS

George et al., "Real-time Eye Gaze Direction Classification Using Convolutional Neural Network", Retrieve from internet—https://arxiv.org/pdf/1605.05258.pdf, May 17, 2016, 5 Pages.

(Continued)

*Primary Examiner* — Melur Ramakrishnaiah
(74) *Attorney, Agent, or Firm* — Dicke Billig & Czaja PLLC

(57) ABSTRACT

A method of providing feedback to a presenter in a remote meeting includes capturing images of remote participants in the remote meeting using cameras associated with computing devices that display content presented by the presenter. Eye gaze angle information for at least one of the remote participants is determined based on the captured images. At least one region of interest in the displayed content is identified based on the eye gaze angle information. Feedback is provided to the presenter including an indication of the identified at least one region of interest.

15 Claims, 8 Drawing Sheets

(58) Field of Classification Search
USPC .......................................... 348/14.01–14.16
See application file for complete search history.

(56) References Cited

U.S. PATENT DOCUMENTS

| | | | |
|---|---|---|---|
| 8,516,105 B2 | 8/2013 | Chawla et al. | |
| 8,581,956 B2 | 11/2013 | Robinson et al. | |
| 8,904,296 B2 | 12/2014 | Sahai et al. | |
| 9,547,821 B1* | 1/2017 | Loreggia | G06N 3/08 |
| 2012/0197991 A1* | 8/2012 | Ramani | G06Q 10/10 |
| | | | 709/204 |
| 2013/0124623 A1 | 5/2013 | Munter | |
| 2014/0184550 A1* | 7/2014 | Hennessey | G06F 3/013 |
| | | | 345/173 |
| 2016/0073054 A1* | 3/2016 | Balasaygun | H04L 12/1813 |
| | | | 348/14.08 |

OTHER PUBLICATIONS

Poel et al., "Meeting Behavior Detection in Smart Environments:Nonverbal Cues that Help to Obtain Natural Interaction", Retrieve from internet—https://research.utwente.nl/en/publications/meeting-behavior-detection-in-smart-environments-nonverbal-cues-t, 2008, 6 Pages.

Asteriadis, Stylianos, et al. "Visual focus of attention in non-calibrated environments using gaze estimation." International Journal of Computer Vision 107, No. 3 (Dec. 10, 2013): 293-316.

Raschke, Michael, et al. "Visual analysis of eye tracking data." in Handbook of Human Centric Visualization, (Jun. 25, 2013) pp. 391-409. Springer, New York, NY.

* cited by examiner

EYE GAZE ANGLE FEEDBACK IN A REMOTE MEETING

BACKGROUND

Personalized virtual interaction like video conferencing is increasingly being used to accomplish a variety of tasks, such as conducting a remote meeting. Video conferencing enables participants located at different sites to simultaneously interact via two-way video and audio transmissions. A video conference can be as simple as a conversation between two participants located at different sites or involve discussions between many participants located at different sites and may include shared presentation content such as a video presentation or slides. As high-speed network connectivity is becoming more widely available at lower cost and the cost of video capture and display technologies continues to decrease, video conferencing conducted over networks between participants in faraway places is becoming increasingly popular.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples involve multiple participants connected together over a network for a virtual interaction, such as a remote meeting. A remote meeting as used herein is intended to refer to an interaction between at least two participants where not all of the participants are located at the same physical location (i.e., at least one of the participants is remotely located). The participants of a remote meeting may use a portable or non-portable computing device, such as, but not limited to, a personal computer, a desktop computer, a laptop computer, a notebook computer, a network computer, a personal digital assistant (PDA), a mobile device, a hand-held device, or any other suitable computing device. Some examples involve at least one presenter and a multiple number of participants connected together over a network, such as, the Internet. It may be noted that the presenter is a "participant" in the context of a remote meeting of this nature, where he or she is interacting with other "participants".

Some examples are directed to applying gaze detection to determine participant attention information in a remote meeting, and providing feedback to a presenter of the remote meeting. Gaze angle information of meeting participants is determined using a gaze-sensitive interface (e.g., webcam) associated with a computing device of each participant. Some examples rely on the images obtained from consumer level webcams and deal with unconstrained environments, which may include different head poses, variable illumination, as well as other factors. Some examples extract information from these images, such as detecting facial landmarks, head rotation, eye location, and head angle. Eye information is determined and input to a convolutional neural network (CNN) to extract features, which are used as input for a machine learning prediction module to determine the eye gaze angle. Based on the eye gaze angle information, regions of interest in the content being presented are identified and provided as feedback to the presenter.

Figure 1:
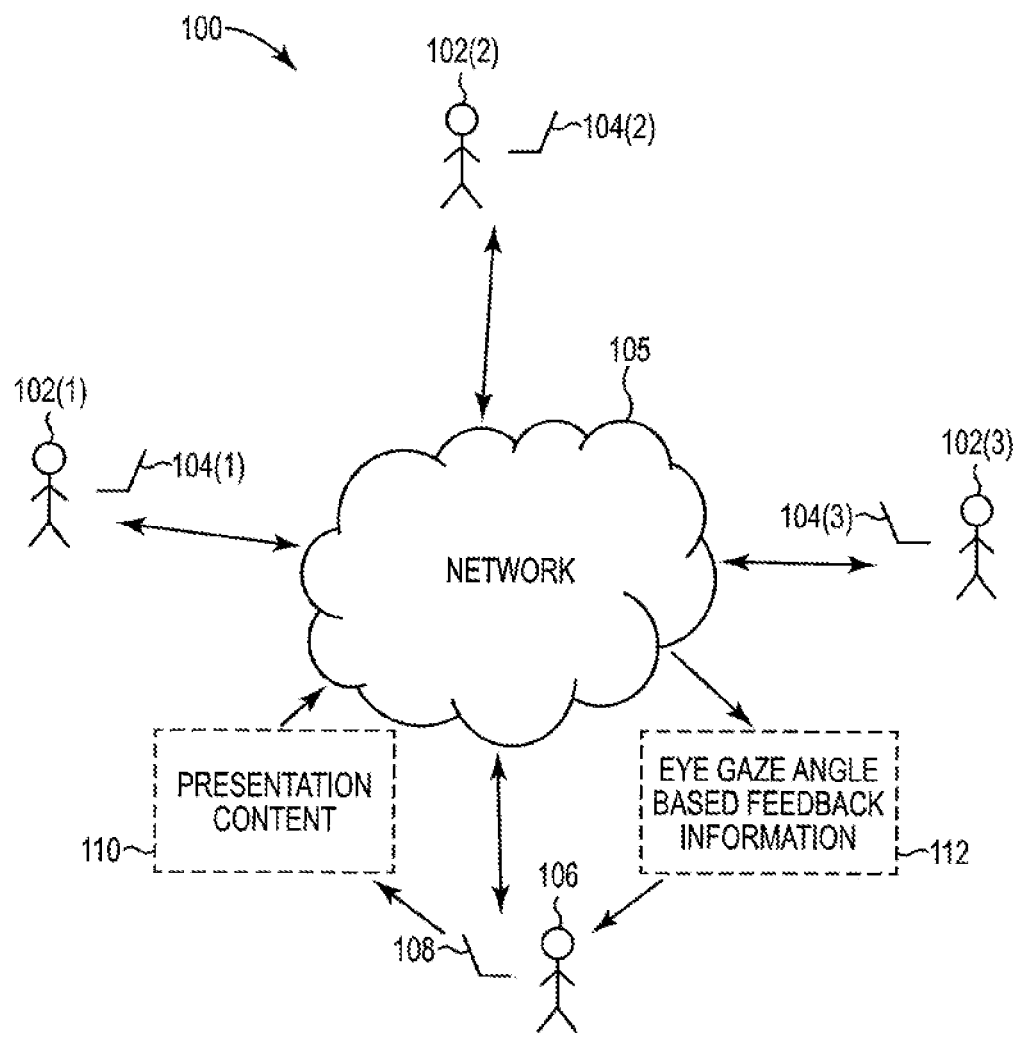
FIG. 1 is a diagram illustrating a remote meeting system according to one example.

FIG. 1 is a diagram illustrating a remote meeting system 100 according to one example. The system 100 involves multiple remote participants 102(1)-102(3) (collectively referred to as remote participants 102) with associated remote computing devices 104(1)-104(3), respectively, and a presenter participant 106 with an associated presenter computing device 108. The computing devices 104 and 108 are communicatively coupled to each other via network 105. Each of the computing devices 104/108 includes a remote meeting application (e.g., Lync, Skype, Webex, Google Hangouts), and generates video and audio streams during the remote meeting, which are sent to the network 105, and then provided to each of the other computing devices 104 and 108.

Computing devices 104 and 108 may include a personal computer, a desktop computer, a personal digital assistant (PDA), a mobile device, a hand-held device, or other type of computing device. The network 105 may be a wired network, a wireless network, or a combination of wired and wireless networks. In some examples, network 105 is a computer network, which may include a private network, such as an intranet, or a public network, such as the Internet. System 100 may also be implemented using a cloud computing architecture.

The presenter participant 106 communicates with the remote participants 102 over network 105 for a virtual interaction (e.g., a remote meeting). Presenter participant 106 uses presenter computing device 108 to transmit presentation content 110 (e.g., slides, text, images, video, etc.) to network 105. Remote participants 102(1)-102(3) use remote computing devices 104(1)-104(3), respectively, to receive the transmitted presentation content 110 from the network 105 and display the received presentation content 110. In some examples, remote computing devices 104(1)-104(3) determine eye gaze angle based feedback information 112 for their associated remote participants 102(1)-102

(3), respectively, and transmit that information 112 to presenter computing device 108 via network 105 during the remote meeting.

Figure 2:
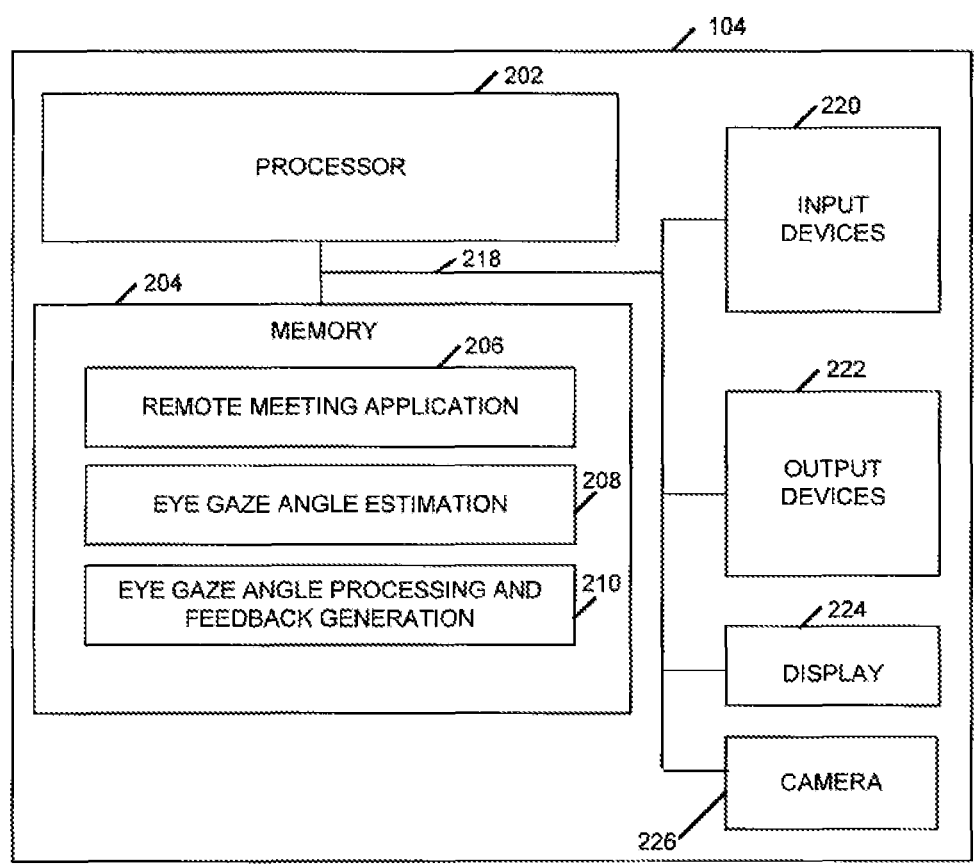
FIG. 2 is a block diagram illustrating one example of a remote computing device for the remote meeting system shown in FIG. 1.

FIG. 2 is a block diagram illustrating one example of a remote computing device 104 for the remote meeting system 100 shown in FIG. 1. Remote computing device 104 includes at least one processor 202, a memory 204, input devices 220, output devices 222, display 224, and camera 226. Processor 202, memory 204, input devices 220, output devices 222, display 224, and camera 226 are communicatively coupled to each other through communication link 218. The camera 226 can be embedded within the frame of the display 224, mounted along at least one of the edges of the display 224, or mounted in a suitable location in the room in which the display 224 is located.

Input devices 220 include a keyboard, mouse, data ports, and/or other suitable devices for inputting information into device 104. Output devices 222 include speakers, data ports, and/or other suitable devices for outputting information from device 104.

Processor 202 includes a Central Processing Unit (CPU) or another suitable processor. In one example, memory 204 stores machine readable instructions executed by processor 202 for operating device 104. Memory 204 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 204 is non-transitory in the sense that it does not encompass a transitory signal but instead is made up of at least one memory component to store machine executable instructions for performing techniques described herein.

Memory 204 stores remote meeting application 206, eye gaze angle estimation module 208, and eye gaze angle processing and feedback generation module 210. Processor 202 executes instructions of remote meeting application 206, eye gaze angle estimation module 208, and eye gaze angle processing and feedback generation module 210 to perform the techniques described herein. It is noted that some or all of the functionality of remote meeting application 206, eye gaze angle estimation module 208, and eye gaze angle processing and feedback generation module 210 may be implemented using cloud computing resources.

Remote meeting module 206 allows the user of remote computing device 104 to participate in a remote meeting, and view the presentation content 110 (FIG. 1) for the remote meeting on display 224. During the remote meeting, camera 226 captures images of the user of computing device 104, which are provided to eye gaze angle estimation module 208. Based on the captured images of the user, the eye gaze angle estimation module 208 continually estimates a current eye gaze angle of the user during the remote meeting. Eye gaze angle processing and feedback generation module 210 receives and processes the estimated eye gaze angle data generated by module 208, and generates feedback information (e.g., eye gaze angle based feedback information 112, shown in FIG. 1) that is transmitted to the presenter computing device 108.

Figure 3:
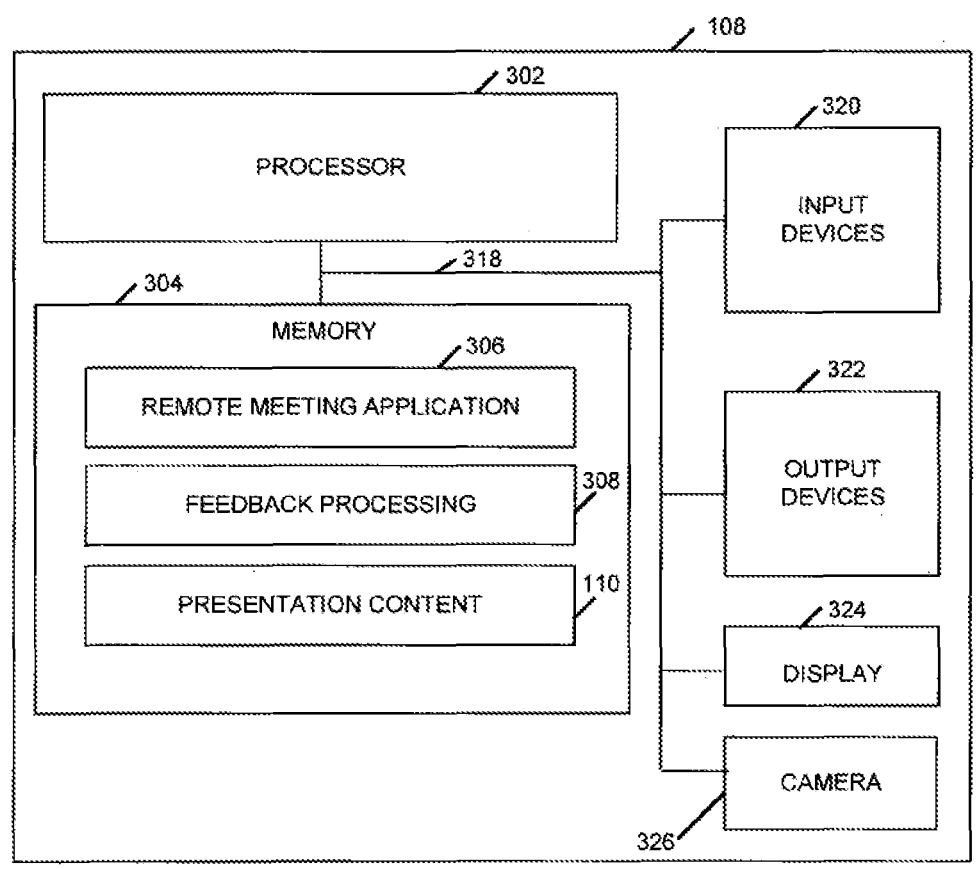
FIG. 3 is a block diagram illustrating one example of a presenter computing device for the remote meeting system shown in FIG. 1.

FIG. 3 is a block diagram illustrating one example of a presenter computing device 108 for the remote meeting system 100 shown in FIG. 1. Presenter computing device 108 includes at least one processor 302, a memory 304, input devices 320, output devices 322, display 324, and camera 326. Processor 302, memory 304, input devices 320, output devices 322, display 324, and camera 326 are communicatively coupled to each other through communication link 318. The camera 326 can be embedded within the frame of the display 324, mounted along at least one of the edges of the display 324, or mounted in a suitable location in the room in which the display 324 is located.

Input devices 320 include a keyboard, mouse, data ports, and/or other suitable devices for inputting information into device 108. Output devices 322 include speakers, data ports, and/or other suitable devices for outputting information from device 108.

Processor 302 includes a Central Processing Unit (CPU) or another suitable processor. In one example, memory 304 stores machine readable instructions executed by processor 302 for operating device 108. Memory 304 includes any suitable combination of volatile and/or non-volatile memory, such as combinations of Random Access Memory (RAM), Read-Only Memory (ROM), flash memory, and/or other suitable memory. These are examples of non-transitory computer readable media. The memory 304 is non-transitory in the sense that it does not encompass a transitory signal but instead is made up of at least one memory component to store machine executable instructions for performing techniques described herein.

Memory 304 stores remote meeting application 306, feedback processing module 308, and presentation content 110. Processor 302 executes instructions of remote meeting application 306 and feedback processing module 308 to perform the techniques described herein. It is noted that some or all of the functionality of remote meeting application 306 and feedback processing module 308 may be implemented using cloud computing resources.

Remote meeting module 306 allows the user of remote computing device 108 to participate in a remote meeting, and present the presentation content 110 for the remote meeting to remote participants 102. The presentation content 110 may be viewed by the presenter on display 324. During the remote meeting, the presentation content 110 is presented to the remote participants 102, and feedback processing module 308 processes the eye gaze angle based feedback information 112 received from the remote participants. In some examples, feedback processing module 308 provides indications on display 324 to identify regions of interest of the presentation content 110 based on the received feedback information 112.

Figure 4:
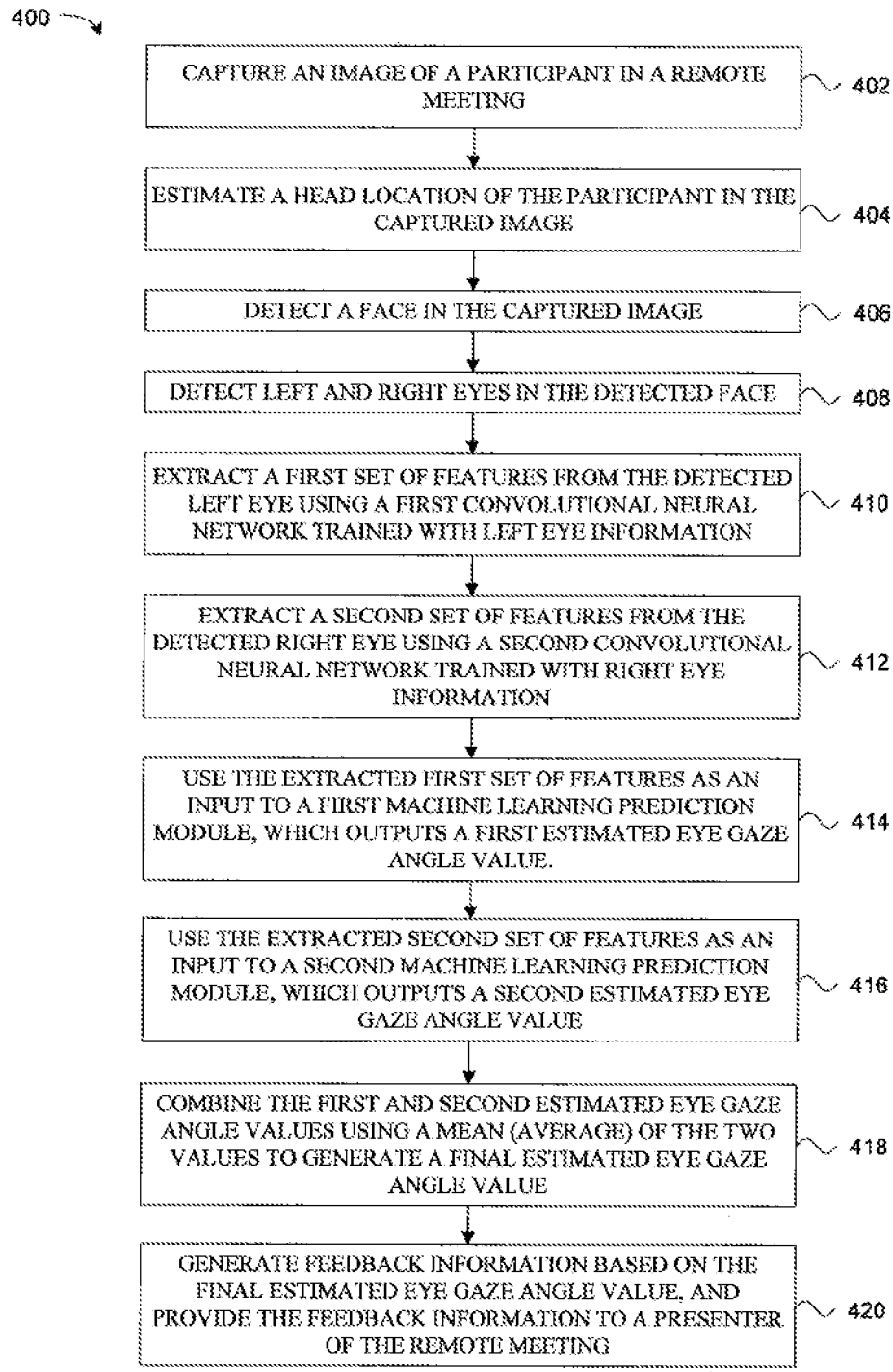
FIG. 4 is a flow diagram illustrating a method of performing eye gaze angle estimation in a remote meeting according to one example.

FIG. 4 is a flow diagram illustrating a method 400 of performing eye gaze angle estimation in a remote meeting according to one example. In one example, remote computing devices 104 (FIG. 1) may perform method 400. At 402 in method 400, an image of a participant 102 in a remote meeting is captured. The image may be captured by camera 226 (FIG. 2). At 404, a head location of the participant 102 in the captured image is estimated by estimation module 208. At 406, a face in the captured image is detected by estimation module 208. At 408, left and right eyes are detected in the detected face by estimation module 208. At 410, a first set of features is extracted from the detected left eye by estimation module 208 using a first convolutional neural network trained with left eye information. At 412, a second set of features is extracted from the detected right eye by estimation module 208 using a second convolutional neural network trained with right eye information. Features are data used by machine learning models to learn. At 414, the extracted first set of features is used as an input to a first machine learning prediction module that is part of estimation module 208, and which outputs a first estimated eye gaze angle value. At 416, the extracted second set of features is used as an input to a second machine learning prediction module that is part of estimation module 208, and which outputs a second estimated eye gaze angle value. At 418, the first and second estimated eye gaze angle values are combined by estimation module 208 using a mean (average) of the two values to generate a final estimated eye gaze angle value. Using both eyes and combining their estimated gaze angles with a mean between them increases the accuracy of the output compared to a solution that uses a single eye. At 420, feedback information is generated by module 210 based on the final estimated eye gaze angle value, and is provided to a presenter of the remote meeting.

Method 400 may be performed for each participant 102 in a remote meeting to determine a current eye gaze angle value for each such participant 102. Method 400 may also be continually repeated to provide to presenter 106 continuous updates regarding the focus of attention of each participant 102. Temporal attention information of overall participants 102 during the remote meeting may also be generated and provided to presenter 106.

In method 400 according to one example, the CNN is used to extract relevant features, and a further machine learning prediction module is used to output the estimated gaze angle. Some examples of method 400 use high performance convolutional-based networks such as "VGG" CNN architecture, which was developed by the Oxford University Visual Geometry Group and provides better feature extraction power than, for example, the AlexNet architecture. Other examples of method 400 may use other deep neural network architectures.

By tracking eye movements of the participants 102, system 100 (FIG. 1) can determine if an individual is facing away from the computing device 104 or has closed his or her eyes. System 100 can also determine if overall participants' eye movements have increased or decreased. In some examples, immediate feedback is provided to the presenter computing device 108 during the remote meeting and includes an identification of the part or parts of the presentation content 110 currently receiving the most attention from the participants 102, which allows the presenter 106 to adapt the speech accordingly (e.g., increasing or slowing the pace of the presentation, or checking if anyone has questions, or changing other characteristics of the presentation). By knowing the specific focus of attention or where specific individuals (or groups of individuals) pay attention during a remote meeting, the presenter 106 can personalize content to maximize the attention of the specific audience the presenter 106 is targeting. The presenter 106 may also use this feedback after the remote meeting in order to adapt and enrich subsequent presentations.

System 100 may also evaluate the attention of participants 102 along the time axis of the presentation. A temporal series includes the flow of time as another layer of information, and allows the visualization of different information and patterns.

Figure 5:
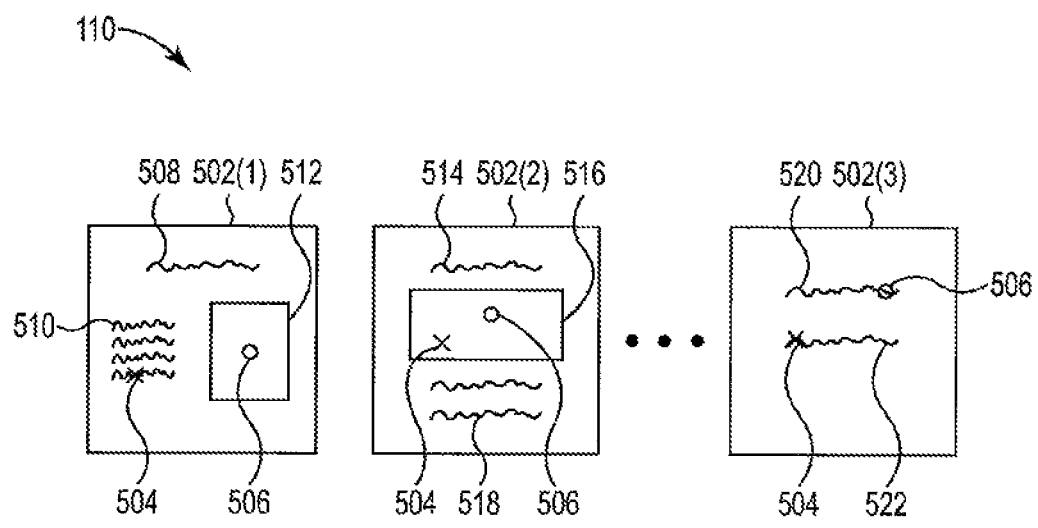
FIG. 5 is a diagram illustrating the providing of feedback to a presenter in a remote meeting according to one example.

FIG. 5 is a diagram illustrating the providing of feedback to a presenter 106 in a remote meeting according to one example. Presentation content 110 is displayed on the presenter computing device 108 during a remote meeting. In the illustrated example, the presentation content 110 includes a plurality of slides 502(1)-502(3) (collectively referred to as slides 502) that are presented over time. Slide 502(1) includes slide title 508, text 510, and image 512. Slide 502(2) includes slide title 514, image 516, and text 518. Slide 502(3) includes slide title 520 and text 522.

During the presentation of the slides 502, eye gaze angle based feedback information 112 for each participant 102 is received by presenter computing device 108. In the illustrated example, based on the received eye gaze angle based feedback information 112, presenter computing device 108 provides an indication on the displayed presentation content of the current focus of attention of each participant 102. For example, indicator 504 may represent the focus of attention of a first participant 102(1), and indicator 506 may represent the focus of attention of a second participant 102(2). As shown by the indicator 504 in FIG. 5, the first participant 102(1) focused on the text 510 in slide 502(1), the image 516 in slide 502(2), and the text 522 in slide 502(3). As shown by the indicator 508 in FIG. 5, the second participant 102(2) focused on the image 512 in slide 502(1), the image 516 in slide 502(2), and the slide title 520 in slide 502(3).

In some examples, the positions of the indicators 504 and 506 are continually updated during the remote meeting based on the received eye gaze angle based feedback information 112 to provide the presenter 106 with immediate feedback regarding the current focus of attention of participants 102.

By evaluating where most of the gazes were targeted at, the presenter 106 can prioritize certain segments of his or her material, change the location of certain images and reorganize text to minimize loss of attention, or to increase visibility of content deemed more relevant. The gaze information can be visualized by different metrics, including a heat map that informs through a color gradient which regions were of most interest to participants on a given moment of the presentation.

Figure 6:
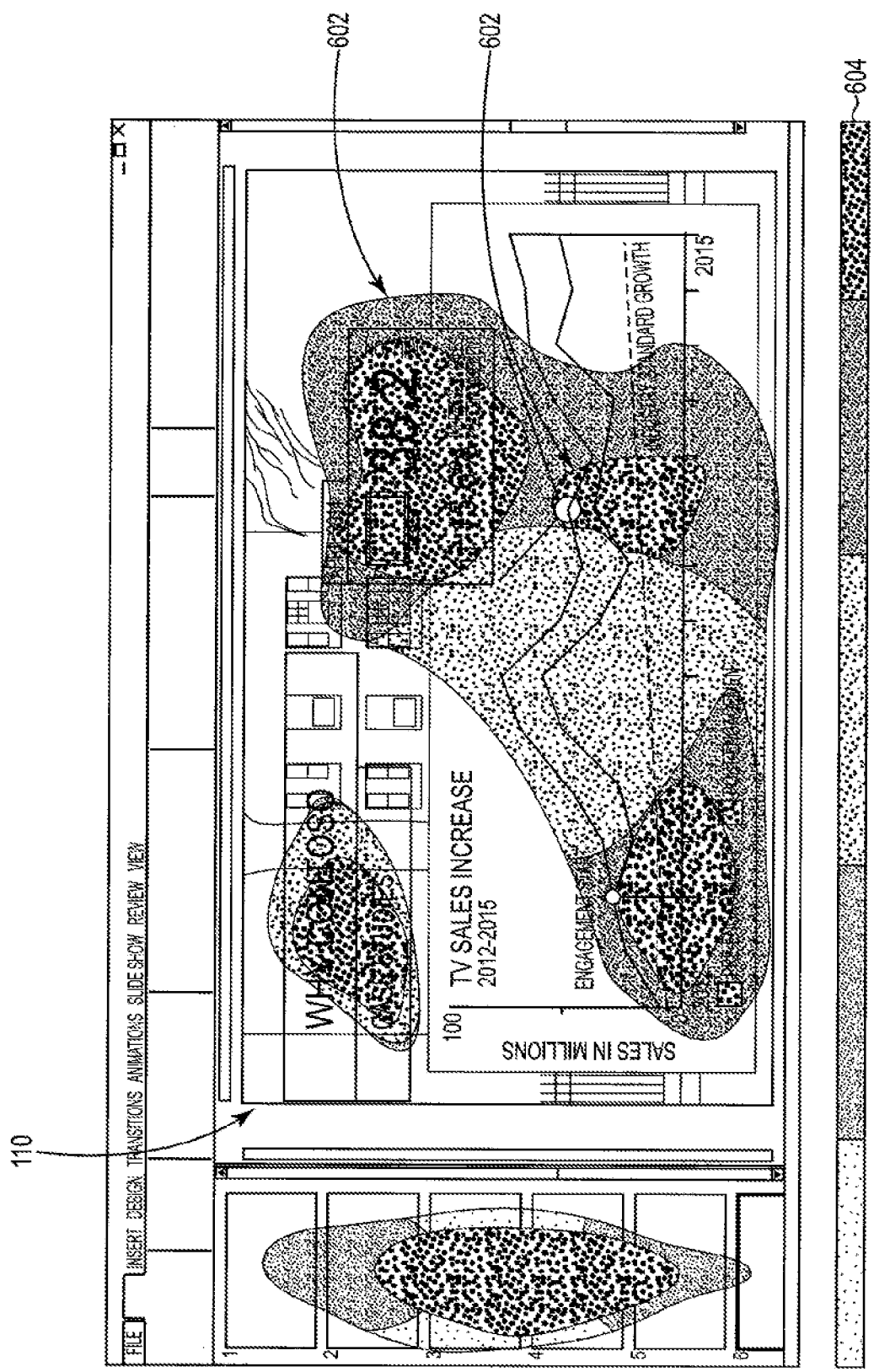
FIG. 6 is a diagram illustrating the display of presentation content with heat map type indications according to one example.

FIG. 6 is a diagram illustrating the display of presentation content 110 with heat map type indications 602 according to one example. The heat map type indications 602 are generated based on the eye gaze angle based feedback information 112, and are overlaid on the presentation content 110 displayed on the presenter computing device 108. The indications 602 identify specific regions of interest in the displayed presentation content 110, as well as the intensity of participant interest. The varying intensities may be represented by different colors, and a corresponding map legend 604 may be displayed that includes colors that vary from the left end of the legend 604 (lowest intensity) to the right end of the legend 604 (greatest intensity).

System 100 may also evaluate which participants 102 had the best focus during the remote meeting or suffered the most interruptions while watching a given presentation. By combining the feedback information 112 from multiple participants 102, the presenter 106 can identify the moment of the meeting where everyone was most focused or more dispersed.

Figure 7:
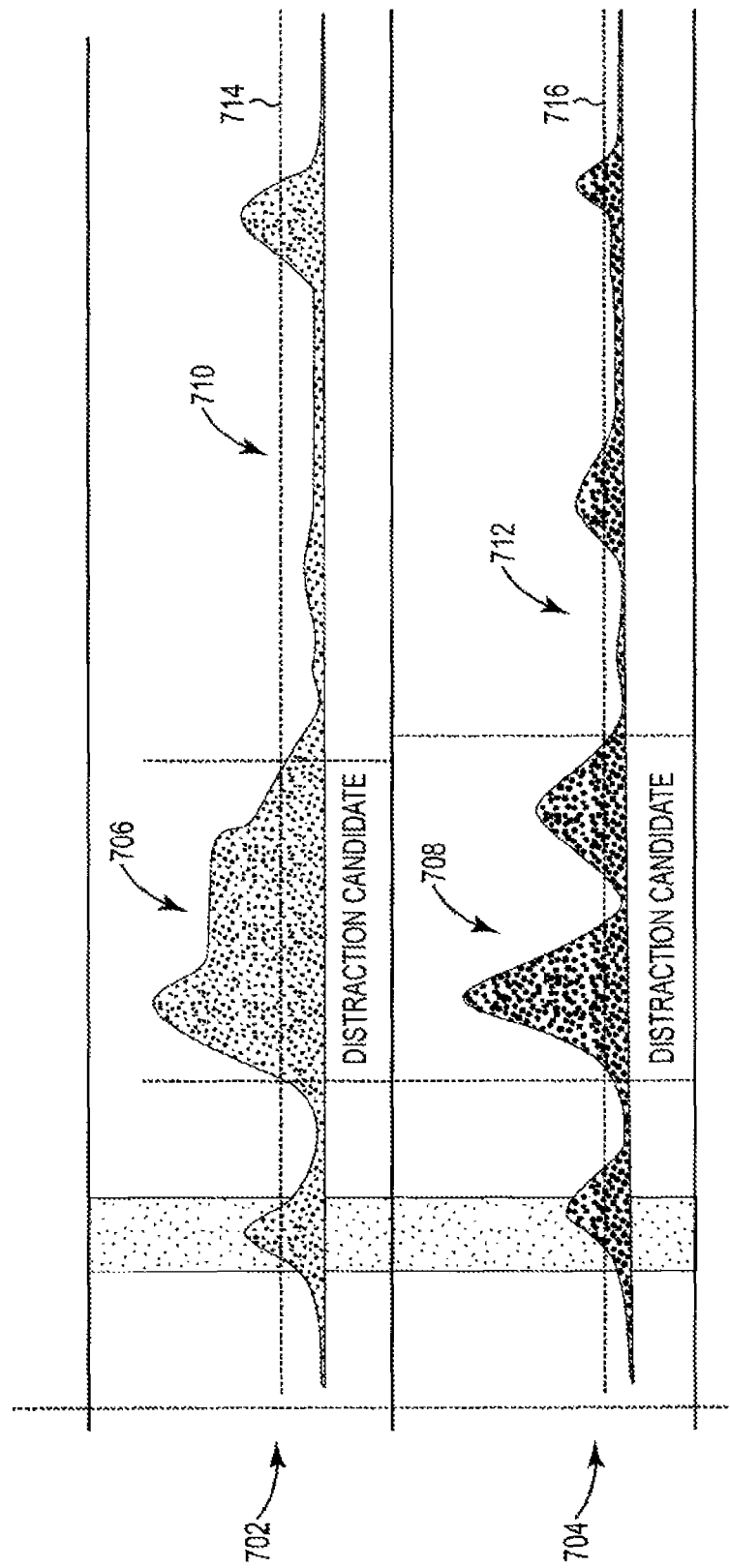
FIG. 7 is a diagram illustrating a graph of eye movement intensity over time for two participants of a remote meeting according to one example.

FIG. 7 is a diagram illustrating a graph of eye movement intensity over time for two participants of a remote meeting according to one example. Graph 702 represents eye movement intensity for a first participant 102(1), and graph 704 represents eye movement intensity for a second participant 102(2). The vertical axis in graphs 702 and 704 represents eye movement intensity, and the horizontal axis in graphs 702 and 704 represents time. During time periods 706 and 708, there is a relatively high level of eye movement intensity for both participants 102(1) and 102(2), which indicates that the specific content being displayed at this time may be a distraction candidate. In contrast, during time periods 710 and 712, for example, the eye movement intensity for the participants 102(1) and 102(2) is lower, potentially indicating a higher level of attentiveness. Graph 702 also includes an indication 714 of an average level of eye movement intensity for the first participant 102(1), and graph 704 includes an indication 716 of an average level of eye movement intensity for the second participant 102(2).

Figure 8:
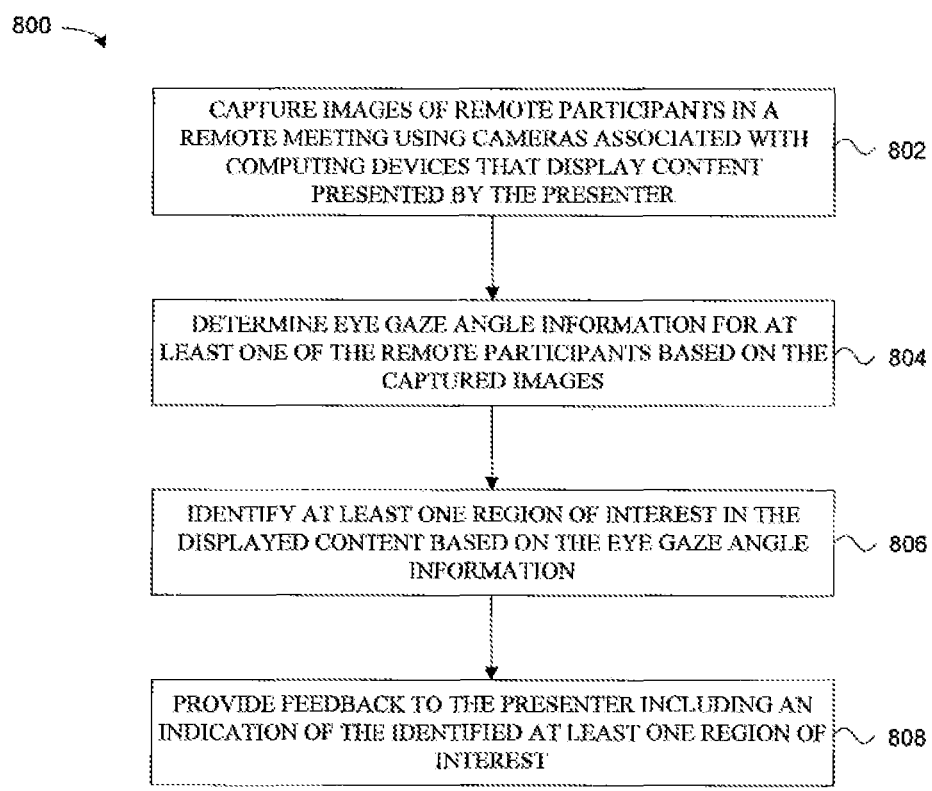
FIG. 8 is a flow diagram illustrating a method of providing feedback to a presenter in a remote meeting.

One example is directed to a method of providing feedback to a presenter in a remote meeting. FIG. 8 is a flow diagram illustrating a method 800 of providing feedback to a presenter in a remote meeting. At 802 in method 800, images of remote participants in the remote meeting are captured using cameras associated with computing devices that display content presented by the presenter. At 804, eye gaze angle information for at least one of the remote participants is determined based on the captured images. At 806, at least one region of interest in the displayed content is identified based on the eye gaze angle information. At 808, feedback is provided to the presenter including an indication of the identified at least one region of interest. In one example, the determining, identifying, and providing are performed by at least one processor.

In method 800, determining eye gaze angle information may include detecting a left eye and a right eye of the at least one remote participant in the captured images, and extracting features from the detected left eye and the detected right eye using at least one convolutional neural network. The at least one convolutional neural network in method 800 may comprise a plurality of convolutional neural networks. The method 800 may include estimating, with a machine learning prediction module, at least one eye gaze angle value based on the extracted features. Extracting features in method 800 may further include extracting a first set of features from the detected left eye using a first convolutional network trained with left eye information, and extracting a second set of features from the detected right eye using a second convolutional network trained with right eye information. The method 800 may further include estimating, with a first machine learning prediction module, a first eye gaze angle value based on the extracted first set of features, and estimating, with a second machine learning prediction module, a second eye gaze angle value based on the extracted second set of features. The method 800 may further include calculating a mean of the first eye gaze angle value and the second eye gaze angle value to determine a final estimated eye gaze angle value. The method 800 may further include providing an indication to the presenter of the current focus of attention of each of the remote participants. The method 800 may further include generating a heat map type indication during the remote meeting that identifies to the presenter regions of the displayed presentation content that are of most interest to the remote participants. The method 800 may further include generating a graph of eye movement intensity over time for the at least one remote participant based on the eye gaze angle information.

Another example is directed to a system that includes a display to display content presented by a presenter of a remote meeting, and a camera to capture images of a remote participant in the remote meeting. The system further includes at least one processor to: determine eye gaze angle values for the remote participant based on the captured images; identify at least one region of interest in the displayed content based on the eye gaze angle values; and output feedback to the presenter during the remote meeting including an indication of the identified at least one region of interest.

The system may comprise a portable computing device, wherein the camera is integrated into the portable computing device. The at least one processor may detect an eye of the remote participant in the captured images, extract features from the detected eye using a convolutional neural network, and estimate, with a machine learning prediction module, an eye gaze angle value based on the extracted features.

Yet another example is directed to a non-transitory computer-readable storage medium storing instructions that, when executed by at least one processor, cause the at least one processor to: generate a display of presentation content remotely provided by a presenter in a remote meeting; receive images of a remote participant in the remote meeting; determine eye gaze angle information for the remote participant based on the received images; identify at least one region of interest in the displayed presentation content based on the eye gaze angle information; and generate feedback information to be provided to the presenter including an indication of the identified at least one region of interest.

The non-transitory computer-readable storage medium may further store instructions that, when executed by the least one processor, cause the at least one processor to: detect an eye of the remote participant in the received images; extract features from the detected eye using a convolutional neural network; and estimate, with a machine learning prediction module, an eye gaze angle value based on the extracted features.

Some examples disclosed herein provide valuable instant personalized feedback information from each participant 102 to a presenter 106 in a remote meeting using low cost components (e.g., a webcam). Some examples may rely on ordinary laptop computer cameras, without additional hardware or environment setup, and provide a cost effective solution for gaze attention detection in remote meetings. Some examples disclosed herein do not use specialized hardware (e.g., virtual reality headsets or depth cameras) to perform attention tracking, and do not involve a special setup space, such as a minimum distance from the hardware, illumination conditions, etc. Such additional specialized hardware increases the cost of a solution, and can limit the portability and practicality of the solution, as well as possibly cause discomfort for participants. Some examples disclosed herein may involve participants that are at a variety of different geographic locations, as opposed to a solution that involves all users being physically present in the same meeting room and under the same illumination constraints and that restricts the number of participants based on the room size, capture device or by other factors.

Some examples use image processing convolutional neural network models that are efficient in automatically detecting relevant features for the classification/regression task of determining an eye gaze angle. Some examples capture each participant's eye gaze angle, and provide custom feedback, such as Information indicating the attention of a specific participant during the remote meeting, or an identification of which slide (or sections of a specific slide) received more attention from the participants during a remote meeting.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:
1. A method of providing feedback to a presenter in a remote meeting, comprising:
  capturing images of remote participants in the remote meeting using cameras associated with computing devices that display content presented by the presenter;

determining eye gaze angle information for at least one of the remote participants based on the captured images, wherein the determining eye gaze angle information includes detecting at least one eye of the at least one remote participant in the captured images, and extracting features from the detected at least one eye using at least one convolutional neural network;

identifying at least one region of interest in the displayed content based on the eye gaze angle information;

providing feedback to the presenter including an indication of the identified at least one region of interest; and wherein the determining, identifying, and providing are performed by at least one processor.

2. The method of claim 1, wherein determining eye gaze angle information comprises:

detecting a left eye and a right eye of the at least one remote participant in the captured images; and extracting features from the detected left eye and the detected right eye using the at least one convolutional neural network.

3. The method of claim 2, wherein the at least one convolutional neural network comprises a plurality of convolutional neural networks.

4. The method of claim 2, and further comprising:

estimating, with a machine learning prediction module, at least one eye gaze angle value based on the extracted features.

5. The method of claim 2, wherein extracting features further comprises:

extracting a first set of features from the detected left eye using a first convolutional network trained with left eye information; and extracting a second set of features from the detected right eye using a second convolutional network trained with right eye information.

6. The method of claim 5, and further comprising:

estimating, with a first machine learning prediction module, a first eye gaze angle value based on the extracted first set of features; and estimating, with a second machine learning prediction module, a second eye gaze angle value based on the extracted second set of features.

7. The method of claim 6, and further comprising:

calculating a mean of the first eye gaze angle value and the second eye gaze angle value to determine a final estimated eye gaze angle value.

8. The method of claim 1, and further comprising:

providing an indication to the presenter of the current focus of attention of each of the remote participants.

9. The method of claim 1, and further comprising:

generating a heat map type indication during the remote meeting that identifies to the presenter regions of the displayed presentation content that are of most interest to the remote participants.

10. The method of claim 1, and further comprising:

generating a graph of eye movement intensity over time for the at least one remote participant based on the eye gaze angle information.

11. A system comprising:

a display to display presentation content provided by a presenter of a remote meeting;

a camera to capture images of a remote participant in the remote meeting; and at least one processor to:

detect an eye of the remote participant in the captured images;

extract features from the detected eye using a convolutional netural network;

determine eye gaze angle values for the remote participant based on the extracted features;

identify at least one region of interest in the displayed presentation content based on the eye gaze angle values; and output feedback to the presenter during the remote meeting including an indication of the identified at least one region of interest.

12. The system of claim 11, wherein the system comprises a portable computing device and the camera is integrated into the portable computing device.

13. The system of claim 11, wherein the at least one processor estimates, with a machine learning prediction module, an eye gaze angle value based on the extracted features.

14. A non-transitory computer-readable storage medium storing instructions that, when executed by at least one processor, cause the at least one processor to:

generate a display of presentation content remotely provided by a presenter in a remote meeting;

receive images of a remote participant in the remote meeting;

extract features from the detected eye using a convolutional neural network:, determine eye gaze angle information for the remote participant based on the extracted features;

identify at least one region of interest in the displayed presentation content based on the eye gaze angle information; and generate feedback information to be provided to the presenter including an indication of the identified at least one region of interest.

15. The non-transitory computer-readable storage medium of claim 14, and further storing instructions that, when executed by the least one processor, cause the at least one processor to:

estimate, with a machine learning prediction module, an eye gaze angle value based on the extracted features.

* * * * *